Jan. 6, 1942.　　　E. R. FITCH　　　2,269,054
BRAKE MECHANISM
Filed Feb. 23, 1940　　　2 Sheets-Sheet 1

Inventor
*Ellery R. Fitch.*
By *N. D. Parker Jr.*
Attorney

Jan. 6, 1942.   E. R. FITCH   2,269,054
BRAKE MECHANISM
Filed Feb. 23, 1940   2 Sheets-Sheet 2
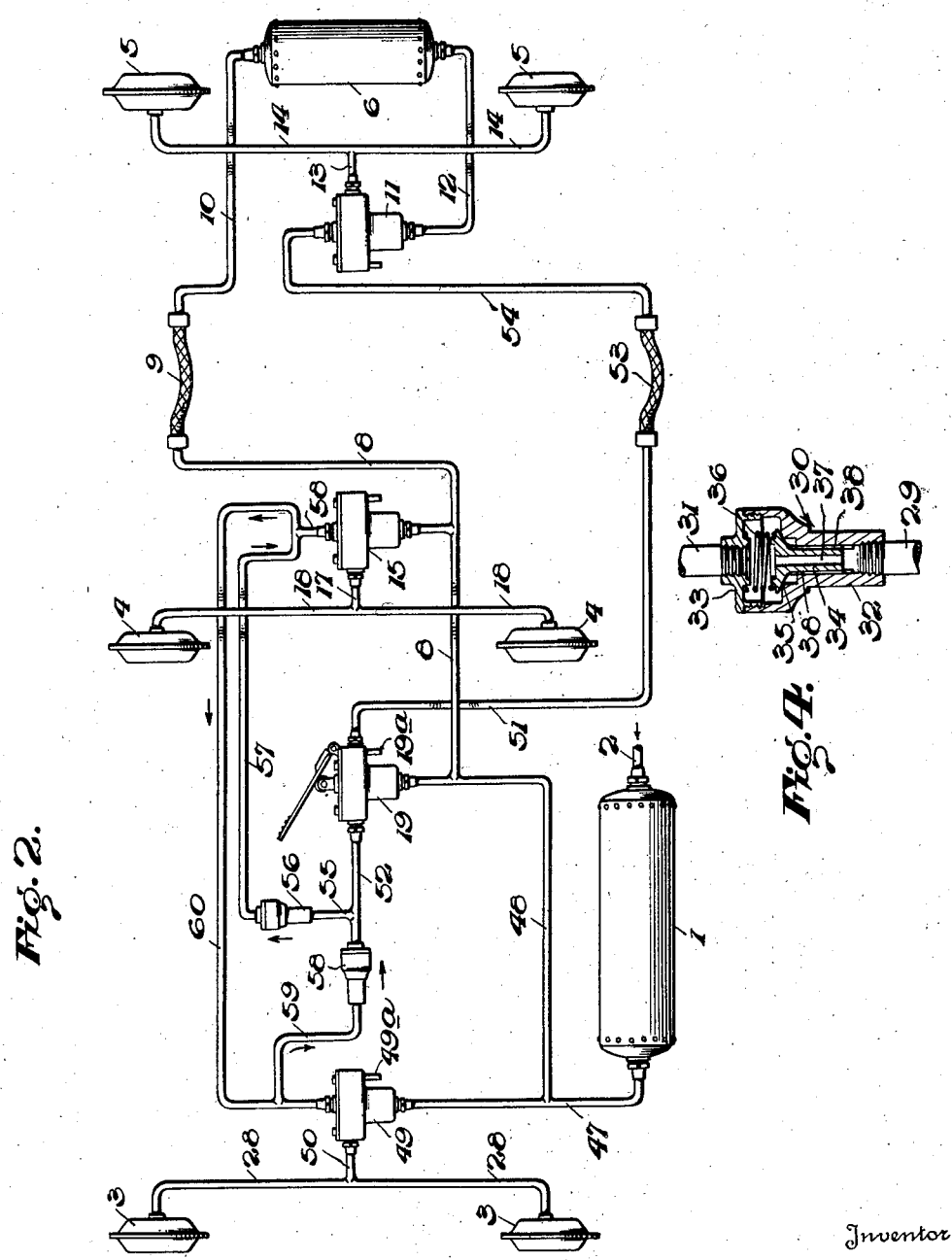
Inventor
*Ellery R. Fitch.*
By *N. D. Parker jr.* Attorney Patented Jan. 6, 1942

2,269,054

UNITED STATES PATENT OFFICE 2,269,054

BRAKE MECHANISM

Ellery R. Fitch, Pittsburgh, Pa., assignor to Bendix-Westinghouse Automotive Air Brake Company, Pittsburgh, Pa., a corporation of Delaware Application February 23, 1940, Serial No. 320,492

20 Claims. (Cl. 188—3)

This invention relates to brakes and more particularly to fluid braking systems for tractor-trailer vehicles.

It is an object of the present invention to provide a fluid pressure braking system for tractor-trailer vehicles which will be so designed that an application of the vehicle brakes will occur in a progressive order, beginning at the rear end of the vehicle train.

Another object of the present invention is to provide a fluid pressure braking system for tractor-trailer vehicles which is so arranged as to secure a release of the vehicle brakes in a progressive order beginning at the front end of the vehicle train.

Another object of the invention is to provide a novel fluid pressure braking system for insuring a progressive application and release of the tractor brakes, respectively beginning at the rear and front of the tractor, when the tractor is disconnected from the trailer.

Still another object of the invention is to provide a fluid pressure braking system having manually-operable means for insuring a progressive application and release of the tractor brakes, respectively beginning at the rear and front of the tractor, when the tractor is disconnected from the trailer.

Other objects and novel features of the invention will appear from the following detailed description when taken in connection with the accompanying drawings. It is to be expressly understood, however, that the drawings are for the purpose of illustration only and are not to be taken as a definition of the limits of the invention, reference being had for this purpose to the appended claims.

In the drawings, in which similar reference numbers refer to similar parts throughout the several views:

Fig. 2 is a diagrammatic view showing a modified form of a fluid pressure braking system according to the present invention;

Fig. 4 is a view, partly in section, showing the construction of a valve utilized by the present invention.

Figures 1, 3:
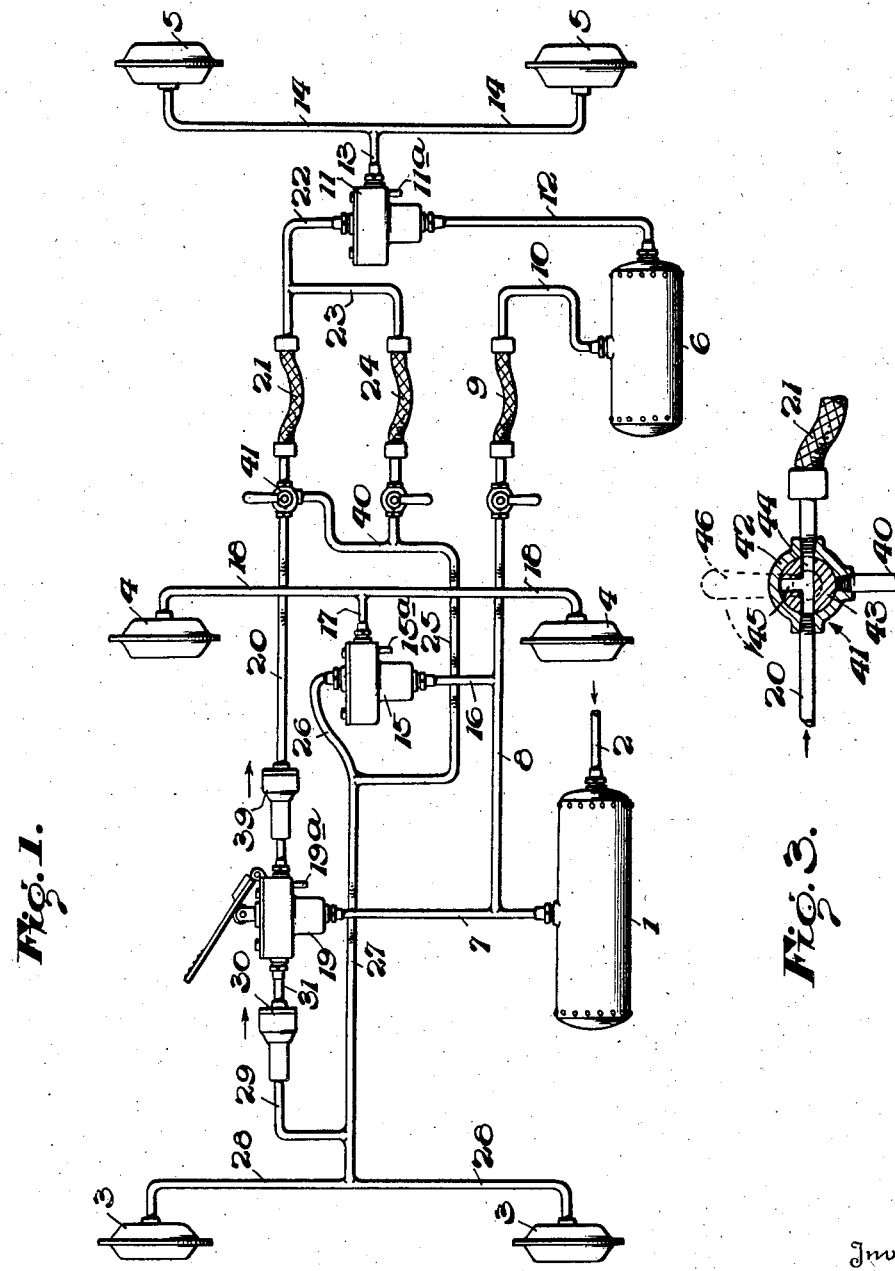
Fig. 1 is a diagrammatic view showing a fluid pressure braking system constructed in accordance with the principles of the present invention.
Fig. 3 is a view, partly in section, showing a type of valve utilized in relation to the system disclosed in Fig. 1.

The fluid pressure tractor-trailer braking system as illustrated in Fig. 1 of the drawings comprises a reservoir 1 which is supplied with fluid under pressure, such as compressed air, through conduit 2 from a compressor not shown. Brake chambers 3 and 4 are positioned on the tractor and are adapted to be supplied with fluid under pressure from reservoir 1 to respectively operate the front and rear brakes of the tractor. Brake chambers 5 are carried by the trailer and perform the function of operating the trailer brakes. The last named brake chambers are energized with fluid under pressure from a reservoir 6, which is positioned on the trailer, and is supplied with fluid under pressure from reservoir 1 through conduits 7 and 8, flexible connector 9 and conduit 10.

A pressure-operated, self-lapping relay valve 11 of any suitable type, such as that shown in the patent to Eaton et al. No. 2,018,202, dated November 22, 1935, is carried by the trailer and, when energized with fluid under pressure, operates to complete a connection between conduit 12 and conduits 13 and 14, thereby allowing fluid under pressure to pass from reservoir 6 to the brake chambers 5 to cause an application of the trailer brakes. A pressure-operated relay valve 15, constructed to operate in a similar manner as the relay valve 11, is positioned on the tractor for making a connection between the reservoir 1 and the brake chambers 4, through conduits 7, 8 and 16, relay valve 15 and conduits 17 and 18, thereby applying the rear tractor brakes.

Means are provided for operating the relay valves 11 and 15 and also energizing the brake chambers 3, to cause application of the vehicle brakes. Such means include a system of conduits connecting the relay valves 11 and 15, the brake chambers 3 and a brake control valve 19 respectively in a series circuit. Means are also provided to retard the flow of fluid pressure in one direction in the circuit whereby the relay valves 11 and 15 and the front brake chamber will be energized in the order enumerated, thereby causing a progressive application of the vehicle brakes, beginning with the rear end of the vehicle train.

As shown in Fig. 1, such means include a self-lapping brake valve 19 which is constantly supplied with fluid under pressure from the reservoir 1 through conduit 7, and is adapted to be manually operated to supply fluid pressure from the reservoir 1 to the relay valves 11 and 15 and to the brake chambers 3. By the aforementioned operation of the brake valve 19, fluid pressure flows to the relay valve 11 through conduit 20, flexible connector 21 and conduit 22, thereby actuating the relay valve to supply fluid pressure to the brake chambers 5 as heretofore described. Fluid pressure in conduit 22 is conducted to the relay valve 15 on the tractor, through conduit 23, flexible connector 24, and conduits 25 and 26, thereby operating the relay valve 15 in a manner described heretofore, causing energization of the brake chambers 4. The brake chambers 3 are primarily energized with fluid pressure through conduits 27 and 28. They are, however, partially energized through conduit 29, check valve 30 and conduit 31, the last named conduits and check valve forming a connection between the brake valve 19 and conduit 27.

As heretofore stated, means are provided for retarding the energization of the circuit in a direction beginning with conduit 31, thus causing the brake chambers 5 to be fully energized before the brake chambers 3 or 4. As shown, such means include a check valve 30, positioned between conduits 29 and 31, which functions to retard the flow of fluid pressure from the brake valve 19 to the circuit through conduit 29.

With reference more particularly to Fig. 4, a preferred type of check valve 30 is shown therein having casings 32 and 33 with conduits 29 and 31 respectively connected thereto. The valve further comprises a movable member 34 which normally rests upon seat 35 by the action of spring 36. A small passage 37 is provided in the movable member 34 which allows a restricted flow of fluid pressure therethrough from conduit 31 to conduit 29. The movable member is also provided with fluted portions 38 which allow a free passage of fluid pressure through the valve when flowing in a direction from conduit 29 to conduit 31 when the movable member is lifted from the seat 35 by such pressure.

In operation of a valve constructed in a manner heretofore described, fluid under pressure flowing from conduit 31 to conduit 29 can only pass through the small passage 37, thereby restricting the flow of fluid therethrough. However, if the flow of fluid under pressure were in the opposite direction, the movable member 34 would be forced upwardly against the tension of spring 36, as viewed in Fig. 4, thereby allowing the flow of fluid through the flutes 38 and around the member 34, as well as through the small passage 37. Referring again to Fig. 1, the check valve 30 is so positioned between conduits 29 and 31 that the flow of fluid pressure from the brake valve 19 to the circuit by way of conduit 31 will be through the small passage 37, as viewed in Fig. 4, therefore restricting the flow of fluid to the circuit in the above mentioned direction to insure a progressive energization of the brake chambers, beginning at the rear end of the vehicle train, as heretofore stated.

Means are also provided for causing the brakes to release in a progressive order starting at the front end of the vehicle train. Such means, as shown in Fig. 1, include a check valve 39 constructed in a similar manner to check valve 30 and positioned in conduit 20 to retard the flow of fluid from conduit 20 to the brake valve 19 when the brake valve is operated to release the vehicle brakes. As the brake valve 19 is operated to connect the circuit to an atmospheric port 19a associated with the brake valve, the flow of fluid to the port by way of conduit 20 is retarded by by the check valve 39. The exhaust of fluid pressure from the circuit is unrestricted through conduit 29, however, and, therefore, as viewed in Fig. 1, the brake chambers will release in a progressive order, beginning with the brake chambers 3.

The present invention also includes a construction for obtaining an application of the tractor rear brakes before an application of the tractor front brakes and also the release of the brakes in an opposite order when the trailer is disconnected from the tractor. As shown in Fig. 1, such means include a conduit 40 which is directly connected to conduit 25 and which may form a connection with conduit 20 by means of a valve mechanism 41. With reference to Fig. 3, wherein the preferred construction of the valve mechanism 41 is shown, the same includes a casing 42 having fluid connections 20, 40 and 21 associated therewith. A rotatable member 43 is positioned within the casing and is provided with ports 44 and 45 for making a connection between conduits 20 and 21, as shown, or between conduits 20 and 40 when the member 43 is rotated 90° in an anticlockwise direction by movement of the handle 46.

When it is desired to disconnect the trailer from the tractor and continue operation of the latter, the flexible connectors 9, 21 and 24 are disconnected in a manner fully understood by those skilled in the art. By operation of the valve mechanism 41, a connection is made between conduits 20 and 40 on the tractor, and the relay valve 15 is thereby supplied with fluid pressure through conduits 20, 40, 25 and 26. From this arrangement, a series circuit is formed comprising the front braking chamber 3, the brake valve 19 and the relay valve 15, which is energized and deenergized in a manner similar to the circuit heretofore described, thereby causing an application of the rear tractor brakes before the front tractor brakes and the release of the brakes in an opposite order.

The operation of the tractor-trailer braking system heretofore described in relation to Fig. 1 is as follows. At all times, fluid pressure from the reservoir 1 is constantly supplied to the brake valve 19 by way of conduit 7 and to the relay valve 15 by way of conduits 7, 8 and 16. The reservoir 6, carried by the trailer, is likewise constantly supplied with fluid pressure from the reservoir 1 through conduits 7 and 8, flexible connector 9, and conduit 10. The trailer relay valve 11 is constantly supplied with fluid under pressure from the reservoir 6 by way of conduit 12.

By manual operation of the brake valve 19, fluid under pressure flows to the relay valve 11 through conduit 20, flexible connector 21 and conduit 22. The relay valve 11 thereupon operates to complete a connection between the brake chambers 5 and the reservoir 6. Fluid pressure will then flow from the reservoir 6 to the brake chambers 5 through conduit 12, relay valve 11 and conduits 13 and 14 for energizing the brake chambers. The extent of fluid pressure energization of the brake chambers 5 will directly depend upon the fluid pressure present in conduit 22 which is controlled by the manually-operable brake valve 19.

As conduit 22 is energized with fluid under pressure, conduit 23 is likewise energized and fluid is conducted to the relay valve 15 through the flexible connector 24 and conduits 25 and 26. As the aforesaid fluid pressure energizes the relay valve 15, the valve is operated to allow fluid pressure from reservoir 1 to energize the brake chambers 4, through conduits 7, 8 and 16, relay valve 15, and conduits 17 and 18. Conduit 27 is energized with fluid pressure from conduit 25, thereby conducting fluid under pressure to the front brake chambers 3 through conduits 28. Thus it will be readily understood from the foregoing operation that the vehicle brakes are applied in a progressional order, beginning with the rear end of the vehicle train.

Fluid pressure is also supplied to conduit 27 through conduit 31, check valve 30 and conduit 29. However, the flow through conduit 29 is so retarded by the check valve 30 that the complete energization of the brake chambers 3 will be accomplished by fluid pressure which flows to conduit 27 from conduit 25.

It will, therefore, be apparent that, due to the arrangement disclosed in Fig. 1, the brake chambers 5, 4 and 3 will be sequentially energized in the order named upon movement of the brake valve 19.

Due to the substantially direct and unrestricted connection between the brake valve 19 and the relay valve 11, the latter will be energized to cause fluid pressure energization of the trailer brakes 5 prior to energization of the tractor brakes. The relay 15 will be thereafter energized by fluid pressure through conduit 23 located adjacent the relay valve 11. This will cause the rear tractor brakes to be applied a little later than the trailer brakes. The front trailer brake chambers 3 are energized last, by reason of their most remote association with conduit 27. It will be understood that the bypass 37 of the check valve 30 is provided solely for providing a closely regulated sequential action as regards the application of the rear and front tractor brakes and may be varied in size or eliminated if found unnecessary.

When it is desired to release the vehicle brakes, the brake valve 19 is allowed to return to its normal position, thereby closing the connection between conduit 7 and conduits 31 and 20 and connecting conduits 31 and 20 to atmospheric port 19a associated with the brake valve. As the atmospheric connection is made, the check valve 30 is opened due to fluid pressure in conduit 29 and the front brake chambers 3 are promptly exhausted through conduits 28 and 29, check valve 30, conduit 31 and atmospheric port 19a. Likewise, the relay valve 15 returns to its normal position when the fluid pressure is exhausted therefrom through conduits 26, 27 and 29, check valve 30, conduit 31 and brake valve 19. As the relay valve 15 returns to the aforesaid normal position, the connection between the reservoir 1 and the brake chambers 4 is closed and the brake chambers are connected to atmosphere through a port 15a associated with the relay valve. The exhaust of fluid pressure from the relay valve 11 to the atmosphere through the brake valve 19 is retarded due to the check valve 39 which was fully described heretofore. The exhaust of fluid pressure from the relay valve 11 to the brake valve 19 is mainly by way of conduits 22 and 23, flexible connector 24 and conduits 25, 27, 29 and 31. As fluid pressure is exhausted from the relay valve 11 through conduit 22, the relay valve operates to close the connection between the reservoir 6 and the brake chambers 5 and open a connection between the brake chambers 5 and an atmospheric port 11a which is associated with the relay valve.

The check valve 39 is so constructed that the exhaust from the relay valve 11 is retarded by way of conduit 20 to such an extent that the exhaust of fluid pressure from the brake chambers 3 and 4 is substantially completed before the fluid pressure is completely exhausted from the relay valve 11. Therefore, the releasing of the vehicle brakes in a progressive order, beginning at the front of the vehicle train, is obtained.

When it is desired to operate the tractor without the trailer, the flexible connectors 9, 21 and 24 are disconnected in a manner which is fully understood by those skilled in the art. Thereafter, arm 46 of valve 41 is rotated 90° in an anticlockwise direction as viewed in Fig. 1 or Fig. 3 to close the normally open connection between conduits 20 and 22 and open communication between conduits 20 and 25 through conduit 40. Therefore, the novel features of the invention, as heretofore described in relation to Fig. 1, may be obtained whether the tractor is operated when connected to the trailer, or when the trailer is disconnected from the tractor.

With reference to Fig. 2, another form of the present invention is shown wherein the same advantages enumerated in conjunction with the system disclosed in Fig. 1 are obtained. Such a system as disclosed in Fig. 2 comprises front tractor braking chambers 3, rear tractor braking chambers 4, trailer braking chambers 5 and a reservoir 1 which is supplied with fluid under pressure from a compressor, not shown, through conduit 2.

A reservoir 6 is positioned on the trailer and is supplied with fluid under pressure from the reservoir 1 through conduits 47, 48 and 8, flexible connector 9 and conduit 10. A pressure-operated relay valve 11 is provided on the trailer for connecting the reservoir 6 to the brake chambers 5 by means of conduits 12, 13 and 14. The connection is made when the relay valve is operated by fluid under pressure in a manner similar to that heretofore stated in the description of the system disclosed in Fig. 1.

A pressure-operated relay valve 15 is positioned on the tractor and operates to allow fluid under pressure from the reservoir 1 to energize the brake chambers 4 by way of conduits 47, 48 and 8, the relay valve 15 and conduits 17 and 18 in a manner also similar to that heretofore described in relation to Fig. 1.

A pressure-operated relay valve 49, being constructed similarly to the previously mentioned relay valves, is carried by the tractor for supplying fluid under pressure to the brake chambers 3. Conduit 47 constantly supplies fluid under pressure from the reservoir 1 to the relay valve 49, and, when the relay valve is actuated, fluid pressure from the reservoir 1 is allowed to energize the brake chambers 3 by way of conduits 50 and 28.

In this form of the invention, the relay valves 15 and 49 are connected in a series circuit on the tractor, and means are provided in the circuit for causing energization of the relay valve 15 prior to energization of the relay valve 49 and deenergization of the relay valves in an opposite order. The relay valve 11 and the circuit are energized and deenergized by the operation of the brake valve 19. However, the connections therebetween are made independently, i. e., respectively through conduits 51 and 52. Therefore, it is necessary to provide additional means to retard the energization of the circuit, thus insuring the energization of the relay valve 11 before the energization of either of the relay valves carried by the tractor. Also the deenergization of the relay valve 11 must be retarded sufficiently for complete deenergization thereof to occur after the circuit is completely deenergized. The brake valve 19 is constantly supplied with fluid under pressure from reservoir 1 through conduits 47 and 48 and is adapted to be manually operated to form a connection between conduit 48 and conduit 51, and between conduit 48 and the circuit by way of conduit 52.

The trailer relay valve 11 is supplied with fluid under pressure by way of the conduit 51, a flexible connector 53 and a conduit 54, thereby operating the relay valve to form a connection between the reservoir 6 and the brake chambers 5. The relay valves 15 and 49 are likewise supplied with fluid under pressure by the manual operation of the brake valve 19. Such pressure flows from the brake valve 19 to the relay valve 15 by way of conduits 52 and 55, check valve 56 and conduits 57 and 58, thereby operating the relay valve to make a connection between the reservoir 1 and the brake chambers 4. The relay valve 49 is energized with fluid pressure by way of conduits 57 and 60 or by way of conduit 52, check valve 58 and conduit 59. The fluid pressure operates the relay valve 49 to form a connection between the reservoir 1 and the brake chambers 3.

Means are provided for causing the relay valve 15 to become fully energized to a position allowed by the brake valve 19 before the relay valve 49 becomes so energized, so that the rear brakes on the tractor will be fully applied before the front brakes reach their fully applied position. Such means, as shown in Fig. 2, include the check valve 58 which is constructed in the same manner as the check valve disclosed in Fig. 4. The check valve is positioned between conduits 52 and 59 and operates to retard the flow of fluid pressure to the relay valve 49 by way of conduit 59. The relay valve 49 is, therefore, more fully energized through conduits 52 and 55, check valve 56 and conduits 57 and 60. It will be readily understood that the relay valve 15 will be fully energized before the relay valve 49 due to the restriction of the check valve 58 and also because fluid under pressure must flow from the relay valve 15 to the relay valve 49 through conduit 60.

The present invention also contemplates a construction for causing the tractor front brakes to release before the tractor rear brakes when the brake valve 19 is operated to connect the conduit 52 to the atmospheric connection 19a. Such construction, as shown in Fig. 2, comprises a check valve 56 which is constructed in the same manner as the check valve 58. The check valve 56 is positioned between the conduits 55 and 57 and functions to retard the flow of fluid pressure from the relay valve 15 to the atmospheric port associated with the brake valve 19. Due to the retarding effect of the check valve 56, the exhaust of fluid under pressure will largely be by way of conduits 60 and 59, check valve 58, and to the atmospheric port through conduit 52. For the same reasons enumerated heretofore in relation to the energization of the relay valves 15 and 49, the relay valve 49 will reach its normal exhaust position before the relay valve 15, thereby causing the tractor front brakes to release prior to the tractor rear brakes.

Means are further provided for retarding the energization of the relay valve 15 so that the trailer relay valve 11 will be energized before the energization of the relay valve 15 is completed. Such means are included in the check valve 56 which contains therein, as viewed in Fig. 4, a spring 36 which retards the movement of the member 34. The spring is to be so graduated that the energization of the relay valve 11 will occur before that of the relay valve 15.

The exhaust of fluid pressure from the relay valve 11 to the brake valve 19 is restricted sufficiently by the resistance to the flow of fluid through the conduit 54, the flexible connector 53, and conduit 51, so that the complete deenergization of the trailer brake chambers will not take place until after the release of the tractor brakes in the order heretofore stated.

In operation of the above described system, the compressor, not shown, supplies fluid under pressure to the reservoir 1 through conduit 2. At all times, fluid under pressure from the reservoir 1 is constantly supplied to the relay valves 49 and 15 through conduit 47 and conduits 47, 48 and 8 respectively. The reservoir 6 which is carried by the trailer is also constantly supplied with fluid under pressure from the reservoir 1 through conduits 47, 48 and 8, flexible connector 9 and conduit 10. The relay valve 11, being carried by the trailer also, is constantly supplied with fluid under pressure from the reservoir 6 through conduit 12.

The brake valve 19 is constantly supplied with fluid pressure from the reservoir 1 through conduits 47 and 48 and is adapted to be manually operated to connect conduit 48 to conduits 51 and 52, thereby allowing fluid pressure to flow from the reservoir 1 to the last named conduits.

As conduit 51 is energized with fluid under pressure, the same pressure is immediately conducted to the relay valve 11 by way of conduit 51, flexible connector 53 and conduit 54. The relay valve 11, when energized with fluid pressure through conduit 54, operates to form a connection between the reservoir 6 and the brake chambers 5 through conduit 12, the relay valve 11 and conduits 13 and 14. The trailer brakes are thereby applied to a degree controlled by the brake valve 19.

As conduit 52 is energized with fluid under pressure from reservoir 1 due to the aforesaid operation of the brake valve 19, the same fluid pressure is conducted to the relay valves 15 and 49 for respectively causing an application of the tractor rear and front brakes. Fluid under pressure flows to the relay valve 15 through conduits 52 and 55, past the check valve 56 which retards the flow a sufficient amount to insure prior energization of the relay valve 11, as heretofore stated, and through conduits 57 and 58. The relay valve 15 is thereby operated to complete a connection between the reservoir 1 and the brake chambers 4 through conduits 47, 48 and 8, the relay valve 15 and conduits 17 and 18 for applying the rear tractor brakes in a manner enumerated heretofore.

The relay valve 49 is supplied with fluid pressure from conduit 52 past the check valve 58 and through conduit 59. The check valve 58, as heretofore stated, at all times retards the flow therethrough in order to delay a complete energization of the relay valve 49 until complete energization of the relay valve 15 has occurred. Fluid pressure is also supplied to the relay valve 49 through conduit 60 which is connected to the conduit 47 adjacent the relay valve 15. Therefore, as the brake valve 19 is operated, fluid pressure flows to the relay valves 11, 15 and 49 in such a manner that the vehicle brakes are caused to apply in a progressive order, beginning with the rear end of the vehicle train.

When it is desired to release the vehicle brakes, the brake valve 19 is operated to connect conduits 51 and 52 to atmospheric port 19a which is associated with the brake valve. As conduit 52 is connected to atmosphere, the operating fluid will be immediately exhausted from the relay valve 49 through conduit 59, past the check valve 58, which opens when the pressure is reduced in conduit 52, and through the brake valve 19 by way of conduit 52. As the fluid pressure is exhausted from the relay valve 49, the valve operates to close the connection between the reservoir 1 and the brake chambers 3 and connect the brake chambers 3 to an atmospheric port 49a associated with the relay valve 49. The exhaust of fluid pressure from the relay valve 15 is retarded by way of conduits 57 and 55 due to the check valve 56, and, therefore, the relay valve 15 is more completely exhausted by way of conduits 60 and 59. The length of the conduit 60 also retards the exhaust of the relay valve 15 with respect to the relay valve 49, thus causing the relay valve 15 to be exhausted after the relay valve 49. As the relay valve 15 is exhausted in the manner described above, the brake chambers 4 are connected to atmosphere, in a manner similar to that described in relation to the brake chambers 3, thereby releasing the rear tractor brakes.

As heretofore stated, the length of the conduits 51 and 54 offers sufficient resistance to retard the exhaust of fluid pressure from the relay valve 11 so that the relay valve 15 will operate to completely exhaust the brake chambers 4 before the brake chambers 5 are so exhausted.

The form of the invention, as shown in Fig. 2, therefore operates to cause a progressive application of the vehicle brakes beginning at the rear end of the vehicle and also the release of the vehicle brakes in an opposite order. It is also desired to point out, in relation to this form of the invention, that the features of the invention are also obtained when the tractor is disconnected from the trailer. These features are obtained automatically, it being only necessary to disconnect the trailer from the tractor and close conduits 8 and 51 in a manner that is fully understood by those skilled in the art.

It will be seen from the above description that two novel braking systems have been provided which insure a progressive application of the vehicle brakes, beginning at the rear end of the vehicle train, and also the release of the brakes in an opposite order. While certain arrangements and modifications of the system have been illustrated and described herein, it is to be expressly understood that the invention is not limited thereto but may be embodied in other tractor-trailer systems, as will be understood by those skilled in the art. Reference will, therefore, be had to the appended claims for a definition of the limits of the invention.

What is claimed is:

1. A fluid pressure braking system for vehicles comprising a reservoir, front braking devices, rear braking devices, means for connecting the reservoir to said front braking devices, means for connecting the reservoir to said rear braking devices, means for operating said first and said second means, means associated with the last named means for causing energizing of said second means prior to the energizing of said first means, and additional means associated with the said last named means and controlled by said operating means for causing deenergization of said first named means prior to the deenergization of said second means.

2. A fluid pressure braking system for vehicles comprising a reservoir, front braking devices, rear braking devices, trailer braking devices, a trailer reservoir, means for connecting said first reservoir to said front braking devices, means for connecting said first reservoir to said rear braking devices, means for connecting said trailer reservoir to said trailer braking devices, means for operating said first, said second, and said third means, means for causing energization of said third means prior to energization of said second means, means for causing energization of said second means prior to energization of said first means, and other means for causing deenergization of said first, second and third named means in reverse order.

3. In a fluid pressure braking system for vehicles, a reservoir, front braking devices, rear braking devices, a relay valve for connecting the reservoir to said front braking devices, a relay valve for connecting the reservoir to said rear braking devices, a manually-operable valve connected to said reservoir, means including a pair of parallel connections for connecting said manually-operable valve to said first relay valve and to said second relay valve, and means associated with said last means for causing energization of said second relay valve prior to energization of said first relay valve whereby said rear braking devices are operated prior to operation of said front braking devices.

4. In a fluid pressure braking system for vehicles, a reservoir, front braking devices, rear braking devices, a relay valve for connecting the reservoir to said front braking devices, a relay valve for connecting the reservoir to said rear braking devices, a manually-operable valve connected to said reservoir, means including a pair of parallel connections for connecting said manually-operable valve to said first relay valve and to said second relay valve, means associated with said last means for causing energization of said second relay valve prior to energization of said first relay valve whereby said rear braking devices are operated prior to operation of said front braking devices, and means associated with said first means for causing deenergization of said first relay valve prior to deenergization of said second relay valve whereby said front braking devices will release prior to release of said rear braking devices.

5. In a fluid pressure tractor-trailer braking system, front braking devices on said tractor, rear braking devices on said tractor, trailer braking devices, a tractor reservoir, a trailer reservoir, a trailer relay valve for connecting said trailer braking devices to said trailer reservoir, a first relay valve for connecting said tractor reservoir to said rear braking devices, a second relay valve for connecting said tractor reservoir to said front braking devices, and a manually-operable valve for energizing said trailer relay valve, conduits connecting said manually-operable valve, said first relay valve and said second relay valve in series relation, said conduits including means for causing energizing of said first relay valve prior to energization of said second relay valve, means for causing deenergization of said second relay valve prior to deenergization of said first relay valve, and means for retarding energization of said first and said second relay valves.

6. In a fluid pressure braking system for vehicles, a reservoir, rear braking devices, front braking devices, a control valve connected to said reservoir, means including a pair of parallel connections for connecting said control valve to said front and to said rear braking devices, means associated with the last named means for causing energization of said rear braking devices prior to energization of said front braking devices, and other means associated with said last named means for causing deenergization of said front braking devices prior to deenergization of said rear braking devices.

7. In a tractor-trailer braking system, the combination of front tractor braking devices, rear tractor braking devices, trailer braking devices, a tractor reservoir, a trailer reservoir connected to said tractor reservoir, a trailer relay valve for connecting said trailer reservoir to said trailer braking devices, a tractor relay valve for connecting said tractor reservoir to said rear braking devices, and a control valve connected to said tractor reservoir, means for connecting said control valve, said trailer relay valve, said tractor relay valve and said front braking devices in series relation, means for causing the energization of said trailer relay valve prior to energization of the tractor relay valve, means for causing energization of said tractor relay valve prior to energization of said front braking devices, and means for causing deenergization of said devices and relay valves in reverse order.

8. In a fluid pressure vehicle braking system having a tractor reservoir, a trailer reservoir connected to said tractor reservoir, trailer braking devices, front tractor braking devices, rear tractor braking devices, a trailer relay valve for connecting said trailer reservoir to said trailer braking devices, and a tractor relay valve for connecting said tractor reservoir to said rear braking devices, means for connecting said trailer relay valve, said tractor relay valve, and said front braking devices in series relation, a control valve included in said series for connecting said tractor reservoir to said series, means associated with the last named means for causing said series to be energized in sequence after first energizing said trailer relay valve, and other means associated with said last named means for causing deenergization of said series in opposite sequence.

9. In a fluid pressure vehicle braking system, a tractor reservoir, front tractor braking devices, rear tractor braking devices, trailer braking devices, a trailer reservoir, means for connecting said tractor reservoir to said front braking devices, means for connecting said tractor reservoir to said rear braking devices, means for connecting said trailer reservoir to said trailer braking devices, means for energizing said first, said second and said third means, the last named means including means for causing energization of said third means prior to energization of said second means, means for causing energization of said second means prior to energization of said first means, means for causing deenergization of said first means prior to deenergization of said second means, and means for causing deenergization of said second means prior to deenergization of said third means.

10. In a tractor-trailer fluid pressure braking system having a tractor reservoir, a trailer reservoir, tractor braking devices, trailer braking devices, and a control valve connected to said tractor reservoir for causing energization of said devices, means for connecting said devices and said control valve in series relation, means associated with the last named means for causing said series to be energized in sequence after first energizing said trailer braking devices, and other means associated with said last named means for causing deenergization of said series in opposite sequence.

11. In a tractor-trailer fluid pressure braking system having a tractor reservoir, a trailer reservoir, tractor braking devices, trailer braking devices, and a control valve connected to said tractor reservoir for causing energization of said devices, means for connecting said devices and said control valve in series relation, said last named means including means for connecting said control valve and said tractor braking devices in series relation when said trailer braking devices are disconnected from said system.

12. In a fluid pressure vehicle braking system having a tractor reservoir, a trailer reservoir connected to said tractor reservoir, trailer braking devices, front tractor braking devices, rear tractor braking devices, a trailer relay valve for connecting said trailer reservoir to said trailer braking devices, and a tractor relay valve for connecting said tractor reservoir to said rear braking devices, means for connecting said trailer relay valve, said tractor relay valve and said front braking devices in series relation, a manually-operable control valve included in said series for connecting said tractor reservoir to said series, means associated with the last named means for causing said series to be energized in sequence to first energize said trailer relay valve, means associated with said last named means for causing deenergization of said series in opposite sequence, and means for connecting said control valve and said tractor braking devices in series relation when said trailer braking devices are disconnected from said system.

13. In a fluid pressure vehicle braking system having a fluid pressure reservoir, a control valve, front braking actuators, rear braking actuators, and a fluid pressure-operated relay valve for connecting said rear braking actuators to said reservoir, means for connecting said control valve, said front braking actuators and said relay valve in a series circuit, means associated with the last named means for causing fluid pressure to flow from said control valve in a direction to energize said relay valve prior to energization of said front braking actuators, and means associated with said last named means for causing the exhaust of fluid pressure from said circuit in a direction to deenergize said front braking actuators prior to deenergization of said relay valve.

14. In a fluid pressure tractor-trailer braking system, front braking devices on said tractor, rear braking devices on said tractor, braking devices on said trailer, a tractor reservoir, a trailer reservoir, a control valve connected to said tractor reservoir, a trailer relay valve for connecting said trailer braking devices to said trailer reservoir, a front tractor relay valve for connecting said tractor reservoir to said front braking devices, and a rear tractor relay valve for connecting said tractor reservoir to said rear braking devices, means for connecting said control valve to said trailer relay valve, means for connecting said rear relay valve and said front relay valve in a series circuit, means for connecting said control valve to said circuit, means associated with said circuit for causing said circuit to be energized in sequence to first energize said rear tractor relay valve, and means associated with said last named means for retarding the energization of said circuit, thereby insuring the energization of said trailer relay valve prior to the energization of said circuit.

15. In a fluid pressure tractor-trailer braking system, front braking devices on said tractor, rear braking devices on said tractor, braking devices on said trailer, a tractor reservoir, a trailer reservoir connected to said tractor reservoir, a trailer relay valve for connecting said trailer braking devices to said trailer reservoir, a rear tractor relay valve for connecting said tractor reservoir to said rear braking devices, a front tractor relay valve for connecting said tractor reservoir to said front braking devices, and a control valve connected to said tractor reservoir, means for connecting said control valve to said trailer relay valve, means for connecting said front relay valve and said rear relay valve in a series circuit, means for connecting said control valve to said circuit for causing the energization thereof, means associated with said circuit for causing said circuit to be energized in sequence to first energize said rear relay valve, means associated with said last named means for causing deenergization of said series in opposite sequence, and means associated with said circuit for retarding the energization of said circuit, thereby insuring the energization of said trailer relay valve prior to the energization of said circuit.

16. In a tractor-trailer braking system comprising a tractor reservoir, a trailer reservoir connected to said tractor reservoir, trailer braking devices, tractor braking devices, a trailer relay valve for connecting said trailer braking devices to said trailer reservoir, and a tractor relay valve for connecting said tractor braking devices to said tractor reservoir, means for connecting said trailer relay valve and said tractor relay valve to said tractor reservoir, said means including means for causing energization of said trailer relay valve prior to energization of said tractor relay valve, and additional connecting means for causing deenergization of said tractor relay valve prior to deenergization of said trailer relay valve.

17. In a tractor-trailer braking system having a tractor reservoir, a trailer reservoir supplied with fluid pressure from said tractor reservoir, trailer braking means, rear braking means for said tractor, front braking means for said tractor, a trailer relay valve for connecting said trailer braking means to said trailer reservoir, and a tractor relay valve for connecting said rear braking means to said tractor reservoir, a manually-operable valve connected to said tractor reservoir and carried by said tractor, a conduit connecting said manually-operable valve to said trailer relay valve for supplying fluid pressure to said trailer relay valve, a conduit connected to said conduit adjacent to said trailer relay valve for supplying fluid pressure to said tractor relay valve, a conduit connected to the last named conduit for supplying fluid pressure to said front braking means, a conduit connecting said front braking means to said manually-operable valve, and means positioned in the last named conduit for restricting the flow of fluid pressure therethrough from said manually-operable valve to said front braking means.

18. In a tractor-trailer braking system having a tractor reservoir, a trailer reservoir supplied with fluid pressure from said tractor reservoir, trailer braking means, rear braking means for said tractor, front braking means for said tractor, a trailer relay valve for connecting said trailer braking means to said trailer reservoir, a tractor relay valve for connecting said rear braking means to said tractor reservoir, and a manually-operable valve positioned on said tractor, a conduit connecting said manually-operable valve to said trailer relay valve for supplying fluid pressure thereto, a second conduit connected to said conduit adjacent said trailer relay valve for supplying fluid pressure to said tractor relay valve, a third conduit connected to said second conduit adjacent said tractor relay valve for supplying fluid pressure to said front braking means, a conduit connecting said manually-operable valve to said third conduit adjacent said front braking means, means positioned in said first conduit for restricting the flow of fluid pressure in said first conduit to said manually-operable valve, and means positioned in the last named conduit for restricting the flow of fluid pressure from said manually-operable valve to said last named conduit.

19. In a fluid-operated tractor-trailer braking system having front braking means for said tractor, rear braking means for said tractor, trailer braking means, a tractor reservoir, and a trailer reservoir connected to said tractor reservoir, a trailer pressure-operated relay valve for connecting said trailer braking means to said trailer reservoir, a tractor pressure-operated relay valve for connecting said rear braking means to said tractor reservoir, a manually-operable valve connected to said tractor reservoir, a conduit connecting said manually-operable valve to said trailer relay valve for supplying fluid pressure thereto, a second conduit having one end thereof connected to said conduit adjacent said trailer relay valve and the other end connected to said tractor relay valve, a third conduit connected to said second conduit adjacent to said tractor relay valve for supplying fluid pressure to said front braking means, a conduit connecting said third conduit to said manually-operable valve, means positioned in said first conduit for restricting the flow of fluid pressure in said first conduit to said manually-operable valve, means positioned in the last named conduit for restricting the flow of fluid pressure from said manually-operable valve to said last named conduit, a conduit carried by said tractor and connected to said first conduit and said second conduit for making a communication between said first and said second conduits, means for normally closing said communication, and means for opening said communication when said trailer braking means are disconnected from said system.

20. In a tractor-trailer fluid pressure braking system for vehicles having front braking means for said tractor, rear braking means for said tractor, trailer braking means, a tractor reservoir, a trailer reservoir supplied with fluid pressure from said tractor reservoir, a trailer pressure-operated relay valve for connecting the trailer braking means to said trailer reservoir, a rear tractor pressure-operated relay valve for connecting said rear braking means to said tractor reservoir, a front tractor pressure-operated relay valve for connecting said front braking means to said tractor reservoir, and a manually-operated valve connected to said tractor reservoir, a conduit connecting said manually-operable valve to said trailer relay valve for supplying fluid pressure thereto, means for connecting said front relay valve and said rear relay valve in series circuit, a conduit connecting said manually-operable valve to said circuit for supplying fluid pressure thereto, means associated with said circuit for causing said circuit to be energized with fluid pressure in sequence after first energizing said rear relay valve, other means associated with said circuit for causing deenergization of said circuit in opposite sequence, and other means associated with said circuit for retarding the energization thereof, thereby insuring the energization of said trailer relay valve prior to the energization of said circuit.

ELLERY R. FITCH.